United States Patent
Kraus (10) Patent No.: US 9,448,139 B2
(45) Date of Patent: Sep. 20, 2016

(54) METHOD, CONTROL UNIT, AND SYSTEM FOR DETERMINING A PARAMETER THAT INDICATES A STATE OF AT LEAST ONE COMPONENT OF A MOTOR VEHICLE

(71) Applicant: CONTINENTAL AUTOMOTIVE GMBH, Hannover (DE)

(72) Inventor: Johannes Kraus, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/425,651

(22) PCT Filed: Oct. 4, 2013

(86) PCT No.: PCT/EP2013/070694
§ 371 (c)(1),
(2) Date: Mar. 4, 2015

(87) PCT Pub. No.: WO2014/056793
PCT Pub. Date: Apr. 17, 2014

(65) Prior Publication Data
US 2015/0241313 A1    Aug. 27, 2015

(30) Foreign Application Priority Data
Oct. 10, 2012 (DE) .......... 10 2012 218 426

(51) Int. Cl.
*B60Q 1/00* (2006.01)
*G01M 17/04* (2006.01)

(52) U.S. Cl.
CPC .................. *G01M 17/04* (2013.01)

(58) Field of Classification Search
CPC .... G07C 5/08; G07C 5/0808; G07C 5/0816; B60R 21/013; B60R 21/0132; B60G 2500/10; G01M 17/04
USPC ................. 340/440, 438, 442; 701/1, 36, 37
See application file for complete search history.

(56) References Cited

U.S. PATENT DOCUMENTS

| | | | |
|---|---|---|---|
| 7,191,637 B2 | 3/2007 | Sonnenburg | |
| 7,813,850 B2 | 10/2010 | Mannerfelt | |
| 7,941,256 B2* | 5/2011 | Namuduri | B60G 17/015 340/522 |
| 2005/0033486 A1* | 2/2005 | Schmitt | B62D 6/00 340/440 |
| 2005/0241366 A1 | 11/2005 | Sonnenburg | |
| 2008/0039994 A1 | 2/2008 | Mannerfelt | |
| 2010/0324858 A1 | 12/2010 | Pannek et al. | |

FOREIGN PATENT DOCUMENTS

| | | |
|---|---|---|
| DE | 4440413 A1 | 5/1996 |
| DE | 19610483 A1 | 9/1997 |
| DE | 102004021131 B3 | 10/2005 |
| DE | 102008007775 A1 | 8/2009 |
| DE | 102010038463 A1 | 2/2012 |
| EP | 0455993 A2 | 11/1991 |
| EP | 1565719 B1 | 2/2007 |

* cited by examiner

*Primary Examiner* — Thomas Mullen
(74) *Attorney, Agent, or Firm* — Laurence A. Greenberg; Werner H. Stemer; Ralph E. Locher (57) ABSTRACT

A method determines a parameter that indicates a state of at least one component of a motor vehicle. The method contains the now described steps. A plurality of values of an instantaneous vertical acceleration of a sub-region of a wheel of the motor vehicle is determined during operation of the motor vehicle by use of at least one sensor arranged in the region of the wheel. In addition, a degree of a mechanical load on at least one component of the motor vehicle is determined on the basis of the determined values of the instantaneous vertical acceleration.

13 Claims, 5 Drawing Sheets

METHOD, CONTROL UNIT, AND SYSTEM FOR DETERMINING A PARAMETER THAT INDICATES A STATE OF AT LEAST ONE COMPONENT OF A MOTOR VEHICLE

BACKGROUND OF THE INVENTION

Field of the Invention

The invention relates to a method for determining a parameter which indicates a state of at least one component of a motor vehicle, and to a control unit and a system for a motor vehicle for determining a parameter which indicates a state of at least one component of the motor vehicle.

EP 1 565 719 B1 discloses a system for diagnosing shock absorbers on a vehicle having at least one wheel axis which has air suspension, which system has a control unit and at least one measuring device which is connected to the control unit. The measuring device can continuously measure a signal which corresponds to the vibrations of at least one wheel axis with air suspension, of the wheel suspension system of the vehicle when the vehicle is driven on a road. The control unit can analyze the measured signal which corresponds to a natural resonant frequency of the wheel suspension system of the vehicle, in order to determine the state of the shock absorbers on the at least one wheel axis with air suspension.

BRIEF SUMMARY OF THE INVENTION

The object of the invention is to specify a method, a control unit and a system for determining a parameter which indicates a state of at least one component of a motor vehicle, which method, control unit and system permit further improved determination of the state of the component.

This object is achieved with the subjects of the independent claims. Advantageous developments can be found in the dependent claims.

A method for determining at least one parameter which indicates a state of at least one component of a motor vehicle comprises, according to one aspect of the invention, the following steps. A plurality of values of an instantaneous vertical acceleration of at least one partial region of at least one wheel of the motor vehicle is determined during operation of the motor vehicle using at least one sensor arranged in the region of the wheel. In addition, a degree of mechanical loading of at least one component of the motor vehicle is determined on the basis of the determined values of the instantaneous vertical acceleration. The at least one component of the motor vehicle can be, for example, a suspension system of a wheel, a spring suspension system of a wheel including shock absorbers, a chassis and/or vehicle bodywork or parts of the specified components.

In this context, here and in the text which follows vertical acceleration is understood to mean the acceleration in the vertical direction of the vehicle. The direction of the vertical acceleration is then parallel to the vertical axis of the vehicle. The vertical acceleration therefore specifies that directional component of the total acceleration which is essentially perpendicular to a roadway on which the motor vehicle is traveling.

The method according to the specified embodiment can permit further improved determination of the state of the at least one component of the motor vehicle. This is carried out, in particular, by determining the degree of mechanical loading on the basis of the determined values of the instantaneous vertical acceleration. In this context, it is possible to proceed from the consideration that the specified components of the motor vehicle are mechanically loaded to a particular degree by vibrations owing to a, for example, uneven roadway since such vibrations are transmitted via the wheels of the motor vehicle to further parts of the motor vehicle, in particular to these components. The vibration profile may be dependent here not only on the roadway conditions but in particular also on the velocity and the type of instantaneous driving maneuver. A measure of the strength of such vibrations can be advantageously determined by determining the instantaneous vertical acceleration of at least a partial region of at least one wheel of the motor vehicle. On the basis of the determined values of the instantaneous vertical acceleration the mechanical loading of the specified components can therefore be determined, for example, on the basis of vibrations resulting from unevenness of the roadway as a parameter which indicates the state of the at least one component. In addition, the method according to specified embodiment permits the degree of mechanical loading to be determined for different components of the motor vehicle on the basis of a common sensor in the form of the sensor arranged in the region of the wheel. The number of components required to carry out the method can therefore be advantageously reduced. For example, an acceleration sensor of a wheel unit of a directly measuring tire pressure monitoring system can also be used for the described method.

In one refinement of the method, the determined values of the instantaneous vertical acceleration are stored. The degree of mechanical loading is determined in this refinement on the basis of the stored values of the instantaneous vertical acceleration. The evaluation of the determined sensor data can therefore also be carried out at a time at which the motor vehicle is not in the driving mode, for example during maintenance of the motor vehicle in a workshop. The determined degree of loading can as a result also be used for diagnostic purposes within the scope of an examination of the motor vehicle carried out, for example, on an annular basis.

In a further embodiment of the method, the determination of the degree of mechanical loading includes determining at least one parameter selected from the group composed of a mean value, a maximum value and a minimum value of the vertical acceleration of the partial region of the wheel on the basis of the determined values of the instantaneous vertical acceleration.

In addition, the determination of the degree of mechanical loading can include determining a statistical distribution of the determined values of the instantaneous vertical acceleration.

The two last-mentioned embodiments advantageously permit here the degree of mechanical loading to be determined in the most accurate way possible.

The degree of mechanical loading is determined in a further refinement on the basis of at least one characteristic curve stored in a memory device. The characteristic curve preferably specifies here the relationship between the above-mentioned parameters of the vertical acceleration, for example the mean value, and the degree of mechanical loading and/or the relationship between the determined statistical distribution of the determined values and the degree of mechanical loading, wherein the corresponding relationships are based, for example, on a model assumption or on reference measurements.

In a further embodiment of the method, in addition a plurality of values of an instantaneous tire internal pressure of a tire of the wheel is determined. The degree of mechanical loading is additionally determined in this embodiment on the basis of the determined values of the instantaneous tire internal pressure. This proceeds from the consideration that in different inflation states of the tire the vibrations are transmitted to differing degrees to the specified components of the motor vehicle. In the case of a low tire internal pressure, the vibrations which are caused by, for example, unevenness of the roadway are absorbed to an increased degree by the tire, whereas in the case of a relatively high tire internal pressure the vibrations are transmitted to an increased degree to the components.

In addition, at least one parameter which indicates an instantaneous loading state of the motor vehicle can be determined. This parameter is referred to in the text which follows as a load parameter. The degree of mechanical loading is additionally determined in this refinement on the basis of the at least one determined load parameter. This proceeds from the consideration that the instantaneous load state of the motor vehicle also has an influence on the mechanical loading of the specified components, wherein a relatively high degree of loading typically brings about relatively strong mechanical loading of the components.

By means of the two last-mentioned embodiments it is therefore possible to determine the degree of mechanical loading to a further improved degree by taking into account the tire internal pressure and/or the load state.

In addition it is possible to determine whether during the determination of the instantaneous vertical acceleration the at least one sensor was located in the region of an instantaneous tire contact area of a tire of the wheel. This procedure is particularly advantageous if an acceleration sensor of a wheel unit of a directly measuring tire pressure monitoring system is used, wherein the wheel unit is arranged on an inner side of the tire. The tire contact area is here that part of the tire which is in contact with the roadway. This part is typically 10-15% of the entire circumference of the tire. The degree of mechanical loading is determined in the specified refinement on the basis of the values of the instantaneous acceleration which have been determined while the at least one sensor was located in the region of the instantaneous tire contact area. This proceeds from the consideration that the values of the instantaneous acceleration which were determined during the specified period by the sensor which rotates with the wheel represent as accurately as possible the degree of vibrations which occur, since the sensor is located in the region of the wheel which is directly affected by the vibrations. As a result, the degree of mechanical loading can be determined particularly precisely on the basis of the values determined in this operating phase. Furthermore, it is particularly easy to determine a vertical acceleration from a measured radial acceleration of a partial region of the wheel if the sensor is located in the tire contact area.

In addition, a message, in particular a warning message, can be issued if the determined degree of mechanical loading exceeds a predetermined threshold value. As a result, the occupants of the motor vehicle, in particular the driver of the motor vehicle, can be informed, for example, that it is necessary to replace or repair that component whose loading exceeds the predetermined threshold value.

In a further embodiment of the method, in addition a degree of wear and/or the probability of failure of the at least one component are determined on the basis of the determined degree of mechanical loading. The specified variables are related to the mechanical loading of the respective component, wherein a high degree of loading typically gives rise to relatively severe wear and a relatively high probability of failure. The variables which are determined can subsequently be used, for example, for determining an instantaneous value of the motor vehicle and/or an anticipated service life of the motor vehicle.

The invention additionally relates to a control unit for a motor vehicle for determining at least one parameter which indicates a state of at least one component of the motor vehicle. The control unit comprises at least one receiver device which is designed to receive a plurality of values of an instantaneous vertical acceleration of at least a partial region of at least one wheel of the motor vehicle during operation of the motor vehicle. In addition, the control unit has a determining device which is designed to determine a degree of mechanical loading of at least one component of the motor vehicle on the basis of the determined values of the instantaneous vertical acceleration. In particular a suspension system, a spring suspension system with or without shock absorbers, a chassis and/or vehicle bodywork or parts of the specified components are possible as components of the motor vehicle.

Furthermore, the invention relates to a system for a motor vehicle for determining at least one parameter which indicates a state of at least one component of the motor vehicle. The system has a control unit according to the specified embodiment and at least one wheel unit. The at least one wheel unit can be arranged here in a wheel of the motor vehicle and comprises at least one sensor which is designed to determine an instantaneous vertical acceleration of at least a partial region of the wheel. This wheel unit may be, in particular, a wheel unit of a directly measuring tire monitoring system.

The control unit and the system for determining the parameter which indicates the state of the at least one component have the advantages which have already been mentioned in relation to the corresponding method and which will not be discussed again at this point in order to avoid repetitions. In addition, the control unit and the system are suitable in particular for carrying out the method according to the invention, wherein this can also apply to the refinements and developments. For this purpose, the control unit and the system can have further suitable devices and/or components.

The at least one sensor is embodied, for example, as a vibration sensor. The at least one sensor can be selected here, for example, from the group composed of a piezoelectric acceleration sensor and a capacitive acceleration sensor, in particular an MEMS (micro-electro-mechanical systems) acceleration sensor.

The at least one sensor can typically be arranged in the region of a tire of the wheel, for example in the region of the tire internal surface or of a valve of the tire. In addition, the at least one sensor can be arrangable on the rim of the wheel.

The motor vehicle is, for example, a passenger car or a truck.

The invention has been explained with reference to a method, a control unit and a system. Unless stated otherwise, the embodiment relating to one claim category (method, control unit and system) can be applied analogously to the other claim categories. It is therefore self evident, for example, that the determining device of the control unit can be designed to be used to determine a degree of mechanical loading of a characteristic curve.

BRIEF DESCRIPTION OF THE SEVERAL
VIEWS OF THE DRAWING

Embodiments of the invention will now be explained in more detail with reference to the appended figures, in which.

DESCRIPTION OF THE INVENTION

Figure 1:
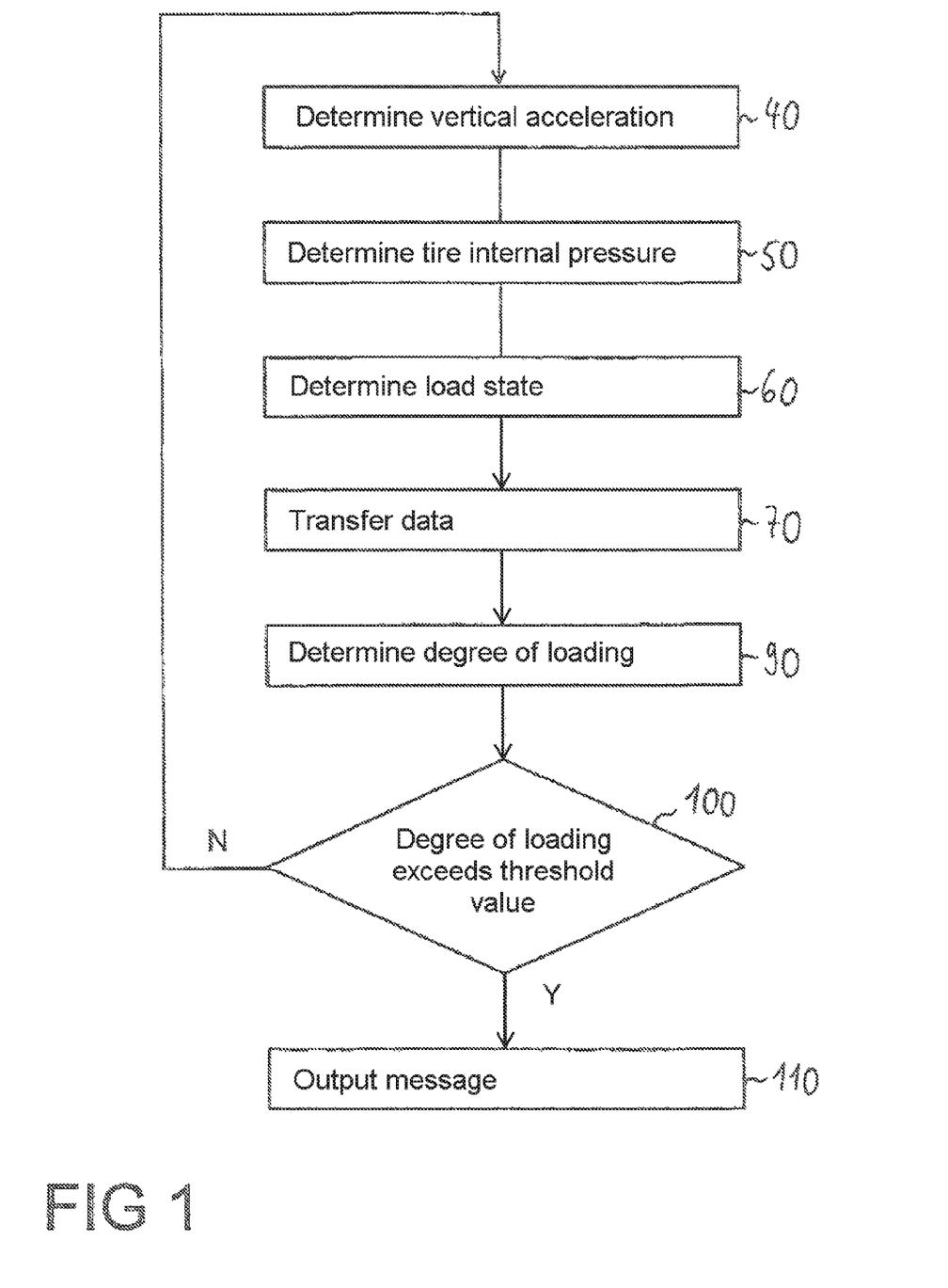
FIG. 1 shows a flowchart of a method for determining a parameter which indicates a state of at least one component of a motor vehicle, according to a first embodiment of the invention.

FIG. 1 shows a flowchart of a method for determining a parameter which indicates a state of at least one component of a motor vehicle, according to a first embodiment. The motor vehicle is, for example, a passenger car or a truck.

In a step 40, during operation of the motor vehicle an instantaneous vertical acceleration of a partial region of at least one wheel of the motor vehicle is determined by means of at least one sensor arranged in the region of the wheel. The at least one sensor is typically arranged here in the partial region of the wheel whose vertical acceleration is determined. In particular, the at least one sensor can be arranged in a tire of the wheel, for example in the region of a tire internal surface. Furthermore, the at least one sensor can be arranged on the rim or the valve of the wheel.

The at least one sensor is embodied, for example, as a vibration sensor by means of which vibrations of the wheel can be determined. In particular, the sensor can be embodied as a piezoelectric acceleration sensor or as a capacitive acceleration sensor.

The at least one sensor can be, for example, part of a wheel unit of a directly measuring tire pressure monitoring system. Such wheel units generally have a sensor which can be used to measure a radial acceleration of the wheel. This radial acceleration comprises a first component which originates from the centrifugal force owing to the rotation of the wheel, and a second component which is caused by the gravity of the earth. The gravity of the earth is therefore superimposed on the centrifugal force. Since the gravity of the earth points toward the exterior of the tire when the sensor is located at the bottom of the wheel, and points to the interior of the tire when the sensor is located at the top of the wheel, the angular position of the sensor can be estimated on the basis of the gravity of the earth. By using the angular position of the sensor it is possible to divide the radial acceleration into two parts, with the result that a vertical acceleration can be calculated from the radial acceleration.

In a step 50, in the embodiment shown an instantaneous tire internal pressure of the tire of the wheel is additionally determined by means of an air pressure sensor.

In addition, in a step 60 a parameter which indicates an instantaneous load state of the motor vehicle is determined. For example, an instantaneous tire load of the tire is determined by means of a tire load sensor.

The steps 40, 50 and 60 can be carried out here simultaneously or in any desired chronological sequence. The steps 40, 50 and 60 are preferably carried out for all the wheels or tires of the motor vehicle.

The determined data, that is to say the determined values of the instantaneous vertical acceleration and of the instantaneous tire internal pressure and of the instantaneous load state are transferred to a central control unit of the motor vehicle in a step 70. In one embodiment, the steps 40 to 70 are run through repeatedly before the system jumps to step 90.

In step 90, a degree of mechanical loading of at least one component of the motor vehicle, selected from the group comprising a suspension system, in particular a wheel suspension system, a spring suspension system, in particular with a shock absorber, a chassis and a typically self-supporting vehicle bodywork, is determined. In the embodiment shown, this is done on the basis of the determined values of the instantaneous vertical acceleration and of the instantaneous tire internal pressure and the parameter which indicates the instantaneous load state of the motor vehicle.

The determination of the degree of mechanical loading includes in this respect, for example, determining at least one parameter selected from the group composed of a mean value, a maximum value and a minimum value of the vertical acceleration and/or determining a statistical distribution of the determined values of the instantaneous vertical acceleration. In particular, the degree of mechanical loading can be determined on the basis of at least one characteristic curve stored in a memory device.

In a step 100 it is determined whether the degree of mechanical loading exceeds a predetermined threshold value. The predetermined threshold value indicates here, for example, loading at which 80% of the expected service life of the component has been reached.

If the degree of mechanical loading does not exceed the predetermined threshold value, the steps 40 to 100 are carried out repeatedly.

On the other hand, if it is determined in step 100 that the degree of mechanical loading exceeds the predetermined threshold value, in a step 110 a message, in particular a visual and/or audible message, is issued. In particular, the message can include an indication of a necessary imminent repair or necessary replacement of the at least one component.

In addition, a degree of wear and/or the probability of failure of the at least one component can be determined on the basis of the determined degree of loading.

Figure 2:
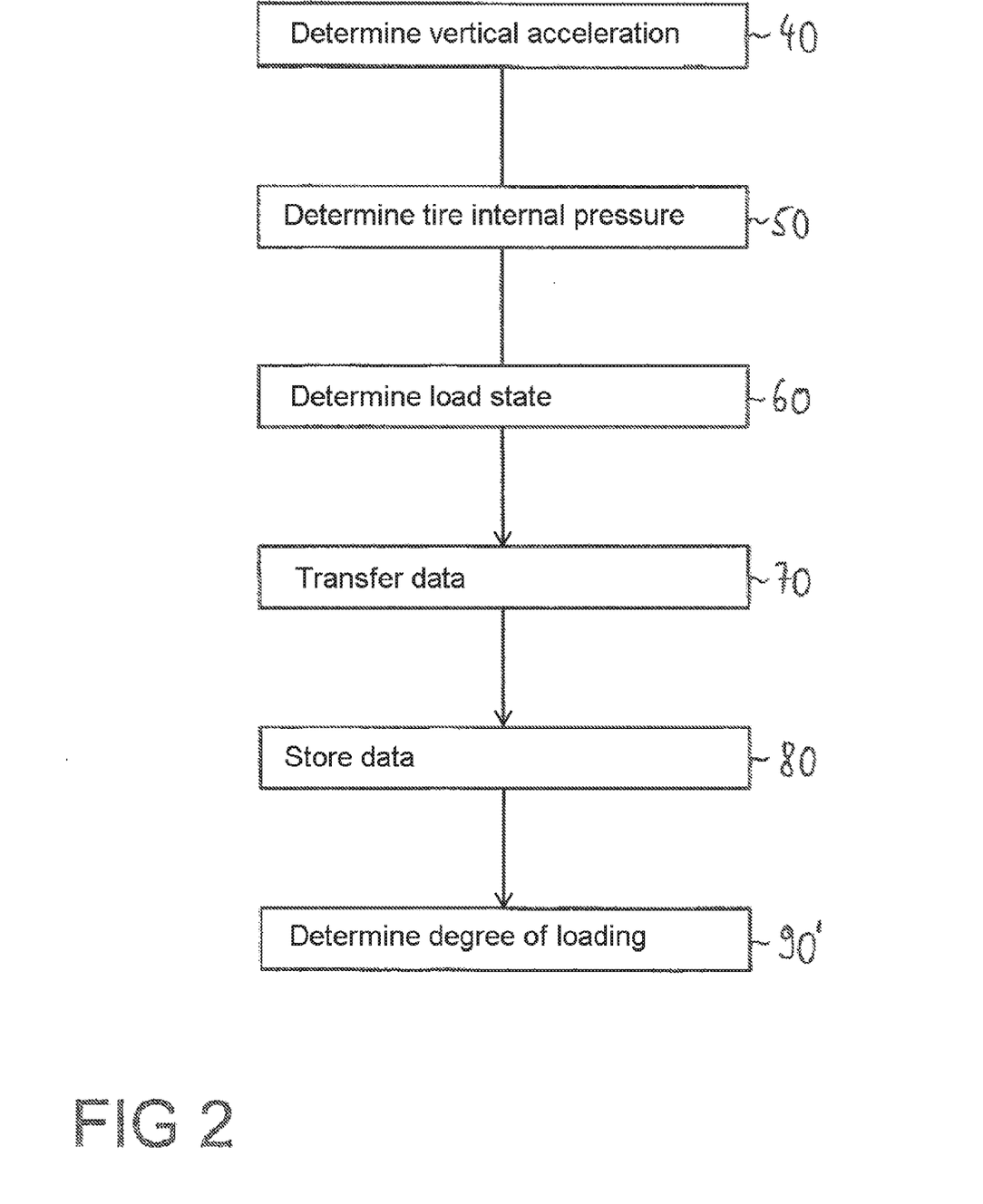
FIG. 2 shows a flowchart of a method for determining a parameter which indicates a state of at least one component of a motor vehicle, according to a second embodiment of the invention.

FIG. 2 shows a flowchart of a method for determining a parameter which indicates a state of at least one component of a motor vehicle, according to a second embodiment. The motor vehicle is, for example, again a passenger car or a truck.

In a step 40, an instantaneous vertical acceleration of a partial region of at least one wheel of the motor vehicle is determined during operation of the motor vehicle, on the basis of data determined by at least one sensor, wherein the sensor is arranged in the region of the wheel, corresponding to the step 40 of the first embodiment shown in FIG. 1.

Furthermore, in a step 50 an instantaneous tire internal pressure of a tire of the wheel is determined, and in a step 60 a parameter which indicates an instantaneous load state of the motor vehicle is determined. The steps 50 and 60 correspond here to the steps 50 and 60 of the first embodiment shown in FIG. 1.

In addition, in a step 70, the determined data are transferred to a central control unit of the motor vehicle, corresponding to step 70 of the first embodiment shown in FIG. 1.

In a step 80, the transferred data are stored in a memory device of the central control unit, for example in what is referred to as an EOBR (Electronic On-Board Recording Unit).

On the basis of the stored values of the instantaneous vertical acceleration, of the instantaneous tire internal pressure and of the instantaneous load state, in a step 90' a degree of mechanical loading of at least one component of the motor vehicle, selected from the group composed of a suspension system, a spring suspension system, a chassis and vehicle bodywork, is determined. The degree of mechanical loading can be determined here, in particular, at a time at which the motor vehicle is not in the driving mode. For example, the degree of mechanical loading of the at least one component can be determined during a motor vehicle's visit to a workshop, in particular within the scope of a check of the motor vehicle which is carried out on a regular basis. For this purpose, the stored data can be transferred to a vehicle-external control unit and evaluated thereby.

In this context, in the step 90' it can be additionally determined whether the at least one sensor was located in the region of an instantaneous tire contact area during the determination of the instantaneous vertical acceleration. For example, this can be determined from a change in acceleration when the tire contact area is entered. In addition, a periodicity of the determined values of the instantaneous vertical acceleration can be determined from the stored values, and the specified state can be inferred therefrom.

The degree of mechanical loading is determined in this refinement on the basis of the values of the instantaneous vertical acceleration which were determined while the sensor was located in the region of the instantaneous tire contact area. For example for the determination of the degree of mechanical loading only values whose absolute value is above a predetermined threshold value are used since the vertical acceleration is typically largest when the sensor has been located in the region of the tire contact area.

Figure 3:
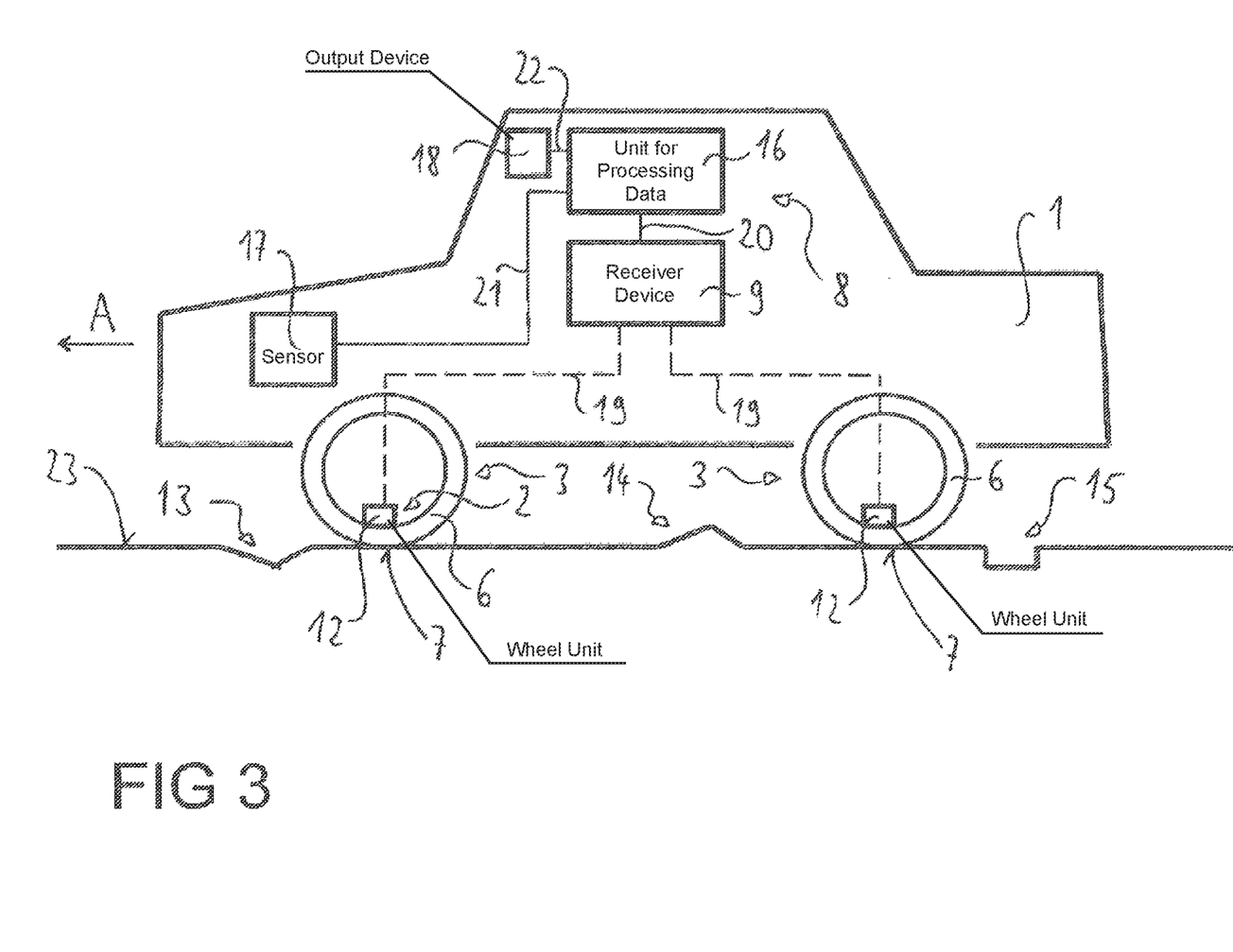
FIG. 3 shows a motor vehicle having a control unit for determining a parameter which indicates a state of at least one component of the motor vehicle, according to an embodiment of the invention.

FIG. 3 shows a schematic illustration of a motor vehicle 1 having a control unit 8 for determining a parameter which indicates a state of at least one component of the motor vehicle 1, according to an embodiment.

In the illustration shown, the motor vehicle 1 is a passenger car and has a total of four wheels, two wheels 3 of which are shown in the form of a front wheel and a rear wheel in FIG. 3.

The motor vehicle 1 is driving in a driving direction illustrated schematically by means of an arrow A, on a roadway 23. The surface of the roadway 23 has several uneven points in the form of a first depression 13, an elevated point 14 and a second depression 15 in the region of the motor vehicle 1. The specified uneven points on the roadway 23 give rise to vibrations of the respective wheel 3 when it is located in the region of the corresponding uneven point. The vibration profile can be dependent here, as already explained, not only on the roadway conditions but also on the velocity, the type of driving maneuver, the tire pressure of a tire 6 of the respective wheel 3 and a load state of the motor vehicle 1. The vibrations are subsequently applied via the wheel 3 to further components of the motor vehicle 1, in particular to a suspension system and a spring suspension system of the wheel 3 as well as to vehicle bodywork of the motor vehicle 1.

A vertical acceleration, brought about by the vibrations, of a partial region 2 of the wheel 3 can be determined by means of a sensor which is arranged in the region of the wheel 3 and which is a component of a wheel unit 12. In the embodiment shown, the wheel unit 12 is arranged here in the region of the tire internal surface of the tire 6 of the wheel 3. In addition, said wheel unit can be arranged on a rim or a valve of the wheel 3. In the situation shown, the wheel units 12 are each located in the region of an instantaneous tire contact area 7 of the corresponding tire 6. Values of the instantaneous vertical acceleration which are determined at such a time by means of the corresponding sensors indicate to a particular degree the vibrations occurring owing to unevenness of the roadway 23.

In the embodiment shown, in this case each of the wheels 3 of the motor vehicle 1 has a separate wheel unit 12. As a result, the instantaneous vertical acceleration can be determined for all the wheels 3 of the motor vehicle 1.

The determined values of the instantaneous vertical acceleration are transferred from the respective wheel unit 12 to a central receiver device 9 of the motor vehicle 1. For this purpose, the wheel units 12 are each coupled via a schematically illustrated operative connection 19, for example a wireless radio link to the receiver device 9.

The receiver device 9 is connected via a signal line 20 to a unit 16 which is designed to process the data transferred by the wheel units 12 and/or to store these data. In addition, the unit 16 is connected via a signal line 21 to a sensor 17 which is designed to determine an instantaneous speed of the motor vehicle. Furthermore, the unit 16 is connected via a signal line 22 to an output device 18. A message can therefore be output by means of the output device 18 if the degree of mechanical loading of certain components of the motor vehicle 1 exceeds a predetermined threshold value, as is explained in more detail in relation to the following figure.

Figure 4:
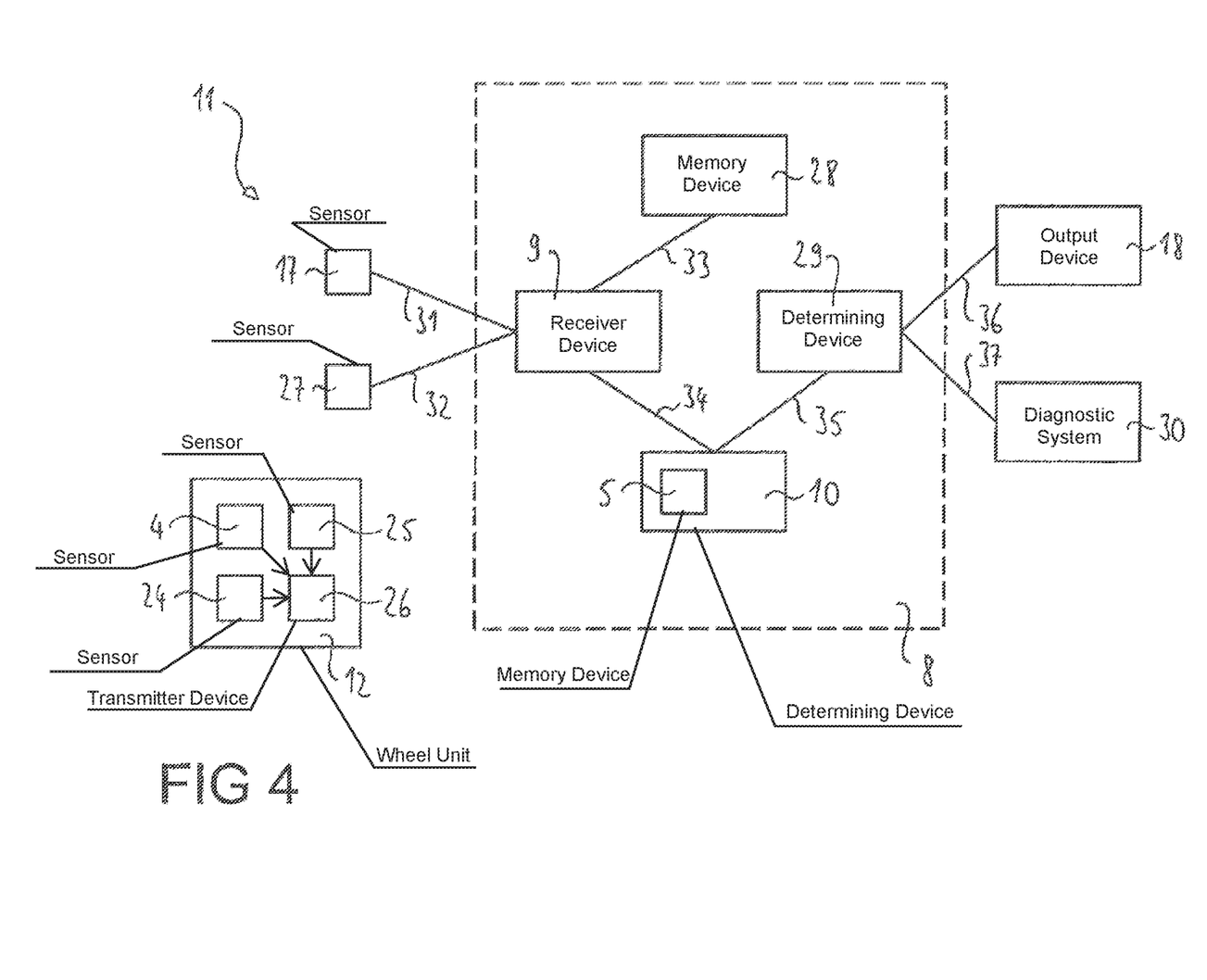
FIG. 4 shows a system for determining a parameter which indicates a state of at least one component of the motor vehicle according to an embodiment of the invention.

In this respect FIG. 4 shows a system 11 for determining a parameter which indicates a state of at least one component of the motor vehicle which is not illustrated in more detail in FIG. 4, according to an embodiment. Components with the same functions as in FIG. 3 are indicated with the same reference symbols and are not explained again in the text which follows.

The system 11 has a control unit 8 as well as a wheel unit 12 for each wheel or each tire of the motor vehicle, wherein only one such wheel unit 12 is illustrated in FIG. 4 for reasons of clarity. The wheel unit 12 is, for example, a component of a tire pressure monitoring system (TPMS).

The wheel unit 12 can be arranged in the respective wheel and in the embodiment shown has in each case a sensor 4 which is designed to determine an instantaneous vertical acceleration of a partial region of the wheel. The sensor 4 is embodied, for example, as a vibration sensor. In particular, the sensor 4 can be embodied as a piezoelectric acceleration sensor or as a capacitive acceleration sensor. The wheel unit 12 preferably has here a plurality of acceleration sensors with which a plurality of directional components of the acceleration can be determined.

In addition, the wheel unit 12 has a sensor 24 which is designed to determine an instantaneous tire internal pressure. In addition, the wheel unit 12 has a sensor 25 for determining an instantaneous tire temperature and a transmitter device 26 by means of which the specified data can be transferred to the control unit 8.

The control unit 8 has for this purpose a receiver device 9 which is coupled to the transmitter device 26 via a wireless link. The receiver device 9 is also connected via a signal line 31 to a sensor 17 which is designed to determine the instantaneous speed of the motor vehicle. In addition, the receiver device 9 is connected via a signal line 32 to a sensor 27 which is designed to determine an instantaneous load state of the motor vehicle.

Furthermore, the control unit 8 has a first determining device 10 which is designed to determine a degree of mechanical loading of at least one component of the motor vehicle, selected from the group composed of a suspension system, a spring suspension system, a chassis and vehicle bodywork. In the embodiment shown, the first determining device 10 is designed to determine the degree of mechanical loading on the basis of the determined values of the instantaneous vertical acceleration, the instantaneous tire internal pressure and the instantaneous load state of the motor vehicle. The first determining device 10 is for this purpose connected via a signal line 34 to the receiver device 9 and has a memory device 5, wherein characteristic curves which represent the relationship between the vertical acceleration, the tire internal pressure, the load state and the degree of mechanical loading, for example on the basis of a model assumption, are stored in the memory device 5.

In the embodiment shown, the control unit 8 also has a second determining device 29 which is designed to determine whether the degree of mechanical loading exceeds a predetermined threshold value. For this purpose, the second determining device 29 is connected to the first determining device 10 via a signal line 35. In addition, the second determining device 29 is designed to output a message by means of an output device 18 of the motor vehicle if the determined degree of mechanical loading exceeds the predetermined threshold value. The output device 18 is for this purpose preferably embodied as a visual and/or audible output device and is connected to the second determining device 29 via a signal line 36. Furthermore, the second determining device 29 is connected to a diagnostic system 30 of the motor vehicle via a signal line 37. The diagnostic system 30 can therefore determine, for example, necessary replacement or necessary repair of the component when the predetermined threshold value of the mechanical loading is exceeded.

The data which is determined by means of the wheel unit 12 are additionally stored in a memory device 28 of the control unit 8 in the embodiment shown. The memory device 28 is for this purpose connected to the receiver device 9 via a signal line 33. As a result, the degree of mechanical loading can also be determined by means of a vehicle-external control unit which is coupled to the control unit 8 for this purpose.

Figure 5:
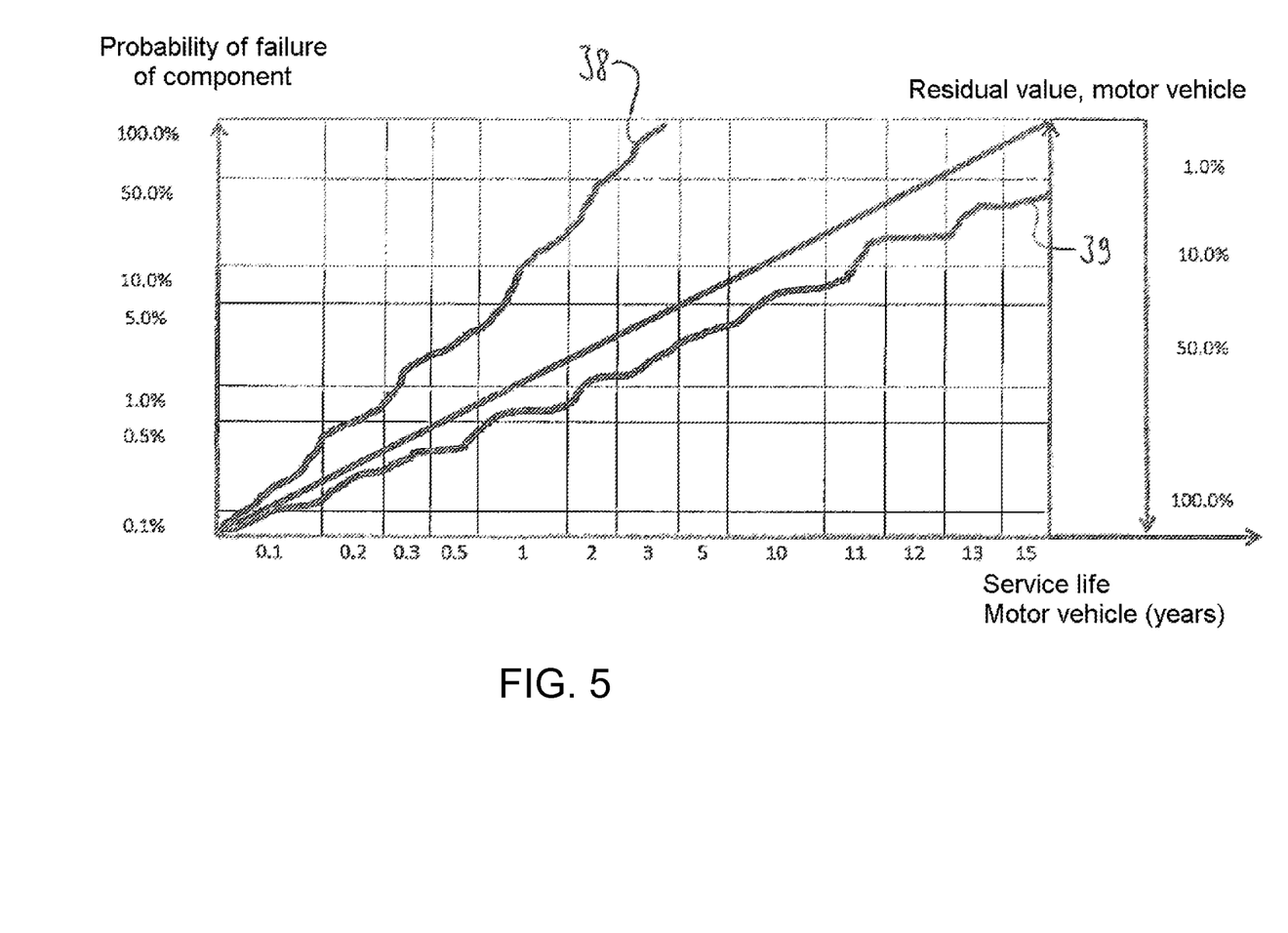
FIG. 5 shows exemplary characteristic curves for different operating conditions of a motor vehicle.

FIG. 5 shows exemplary characteristic curves which represent the time profile of the probability of failure of the at least one component, and the time profile of the residual value of the motor vehicle for different driving profiles or different operating conditions.

For this purpose, on the left-hand ordinate shown in FIG. 5 the probability of failure of the at least one component is represented, and the percentage residual value of the motor vehicle, referred to the original value, is represented on the right-hand ordinate. The service life of the motor vehicle in years is plotted on the abscissa.

A first exemplary characteristic curve 38 indicates here the time profile of the specified variables for a motor vehicle which is predominantly driven on unpaved roadways, whereas a second characteristic curve 39 indicates the time profile for a mixed driving profile, which includes travel both on freeways and on roadways with relatively severe unevenness.

As is illustrated in FIG. 5, the probability of failure of the at least one component is increased owing to increased energy input as a result of vibrations in the first driving profile, illustrated in the characteristic curve 38, compared to the second driving profile, illustrated in the characteristic curve 39, given the same service life of the motor vehicle. The remaining residual value of the motor vehicle is correspondingly smaller in the first driving profile compared to the second driving profile, given the same service life.

By means of embodiments of the present invention, it is advantageously possible to make available a method, a control unit and a system with which data relating to mechanical loading, occurring in the course of the service life of a motor vehicle, of the suspension system, spring suspension system, frame or vehicle bodywork of the motor vehicle can be determined by means of an analysis of acceleration profile data of a wheel sensor.

The acceleration profile data can for this purpose be evaluated, in particular, using a mean value, a minimum value, a maximum value, a statistical distribution, a distribution analysis, for example by means of a Weibull distribution, describing the service life and failure frequency, of a histogram evaluation and/or other algorithms which relate to the mechanical loading of components.

For example, the number of vibrations which correspond to a predetermined standard vibration and which are caused by unevenness of the roadway and are measured by the sensor is determined.

The results obtained therefrom can be used, for example, to determine the remaining duration until a subsequent service examination of the motor vehicle. In addition, the data can be used to be employed, for example, during a service examination in a workshop when overhauling the motor vehicle, in order to permit safety evaluation of the motor vehicle and/or in order to determine the remaining expected service life of the motor vehicle and a remaining value of the motor vehicle. In addition, the probability of failure can be determined on the basis of the measured and recorded loading of the motor vehicle.

The explanations which are given with respect to the figures are to be understood as purely illustrative and not restrictive. A large number of changes can be made to the described embodiments without departing from the scope of protection as defined by the appended claims.

LIST OF REFERENCE NUMBERS

1 Motor vehicle
2 Partial region
3 Wheel
4 Sensor
5 Memory device
6 Tire
7 Tire contact area
8 Control unit
9 Receiver device
10 Determining device
11 System
12 Wheel unit
13 Depression
14 Elevated point
15 Depression
16 Unit
17 Sensor
18 Output device
19 Operative connection
20 Signal line
21 Signal line
22 Signal line
23 Roadway
24 Sensor
25 Sensor 26 Transmitter device
27 Sensor
28 Memory device
29 Determining device
30 Diagnostic system
31 Signal line
32 Signal line
33 Signal line
34 Signal line
35 Signal line
36 Signal line
37 Signal line
38 Characteristic curve
39 Characteristic curve
40 Step
50 Step
60 Step
70 Step
80 Step
90 Step
90' Step
100 Step
110 Step
A Arrow

The invention claimed is:

1. A method for determining a parameter indicating a state of at least one component of a motor vehicle, which comprises the following steps of:
    determining a plurality of values of an instantaneous vertical acceleration of a partial region of a wheel of the motor vehicle during operation of the motor vehicle using at least one sensor disposed in a region of the wheel;
    determining a plurality of values of an instantaneous tire internal pressure of a tire of the wheel; and
    determining a degree of mechanical loading of the at least one component of the motor vehicle on a basis of the values of the instantaneous vertical acceleration and the values of the instantaneous tire internal pressure, the at least one component selected from the group consisting of a suspension system, a chassis and a vehicle body.

2. The method according to claim 1, which further comprises:
    storing the values of the instantaneous vertical acceleration; and
    determining the degree of mechanical loading on a basis of stored values of the instantaneous vertical acceleration.

3. The method according to claim 1, wherein the determining of the degree of mechanical loading includes determining at least one parameter selected from the group consisting of a mean value, a maximum value and a minimum value of a vertical acceleration of the partial region of the wheel on a basis of the values of the instantaneous vertical acceleration.

4. The method according to claim 1, wherein the determining of the degree of mechanical loading includes determining a statistical distribution of the values of the instantaneous vertical acceleration.

5. The method according to claim 1, which further comprises determining the degree of mechanical loading on a basis of at least one characteristic curve stored in a memory device, the characteristic curve specifying at least one relationship selected from the group consisting of a relationship between the instantaneous vertical acceleration and the degree of mechanical loading and a relationship between a statistical distribution of the instantaneous vertical acceleration and the degree of mechanical loading.

6. The method according to claim 1, which further comprises:
    determining at least one load parameter which indicates an instantaneous load state of the motor vehicle; and
    determining the degree of mechanical loading additionally on a basis of the at least one load parameter determined.

7. The method according to claim 1, which further comprises:
    determining whether, during the determining of the instantaneous vertical acceleration, the at least one sensor was disposed in a region of an instantaneous tire contact area of the tire of the wheel; and
    determining the degree of mechanical loading on a basis of the values of the instantaneous acceleration which have been determined while the at least one sensor was disposed in the region of the instantaneous tire contact area.

8. The method according to claim 1, which further comprises issuing a message if the degree of mechanical loading determined exceeds a predetermined threshold value.

9. The method according to claim 1, which further comprises determining at least one of a degree of wear or a probability of failure of the at least one component on a basis of the degree of mechanical loading determined.

10. A control unit for a motor vehicle for determining a parameter indicating a state of at least one component of the motor vehicle, the control unit comprising:
    at least one receiver for receiving a plurality of values of an instantaneous vertical acceleration of a partial region of a wheel of the motor vehicle during operation of the motor vehicle and for receiving an instantaneous tire internal pressure; and
    a determining device for determining a degree of mechanical loading of the at least one component of the motor vehicle on a basis of the values of the instantaneous vertical acceleration and of the instantaneous tire internal pressure, wherein the at least one component is selected from the group consisting of a suspension system, a chassis and a vehicle body.

11. A system for a motor vehicle for determining a parameter indicating a state of at least one component of the motor vehicle, the system comprising:
    a control unit having at least one receiver for receiving a plurality of values of an instantaneous vertical acceleration of a partial region of a wheel of the motor vehicle during operation of the motor vehicle and for receiving an instantaneous tire internal pressure, said control unit further having a determining device for determining a degree of mechanical loading of the at least one component of the motor vehicle on a basis of the values of the instantaneous vertical acceleration and of the instantaneous tire internal pressure, the at least one component selected from the group consisting of a suspension system, a chassis and a vehicle body; and
    at least one wheel unit disposed in the wheel of the motor vehicle, said at least one wheel unit having at least one first sensor for determining the instantaneous vertical acceleration of a partial region of the wheel, and wherein said wheel unit further having a second sensor for determining the instantaneous tire internal pressure.

12. The system according to claim 11, wherein said at least one first sensor is a vibration sensor.

13. The system according to claim 11, wherein said at least one first sensor is selected from the group consisting of a piezoelectric acceleration sensor and a capacitive acceleration sensor.

* * * * *